United States Patent
Lindelsee et al.

(10) Patent No.: US 9,582,799 B2
(45) Date of Patent: Feb. 28, 2017

(54) TOKEN BASED TRANSACTION AUTHENTICATION

(71) Applicant: Visa International Service Association, San Francisco, CA (US)

(72) Inventors: Mike Lindelsee, Redwood City, CA (US); Olivier Brand, Walnut Creek, CA (US); James Dimmick, Foster City, CA (US); Benedicto Dominguez, San Bruno, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/860,402

(22) Filed: Apr. 10, 2013

(65) Prior Publication Data
US 2013/0232079 A1    Sep. 5, 2013

Related U.S. Application Data

(63) Continuation of application No. 13/009,162, filed on Jan. 19, 2011, now Pat. No. 8,346,666.

(60) Provisional application No. 61/296,385, filed on Jan. 19, 2010.

(51) Int. Cl.
| | |
|---|---|
| *G06Q 40/00* | (2012.01) |
| *G06Q 20/38* | (2012.01) |
| *G06Q 20/00* | (2012.01) |
| *G06Q 20/40* | (2012.01) |

(52) U.S. Cl.
CPC ......... *G06Q 20/3829* (2013.01); *G06Q 20/00* (2013.01); *G06Q 20/40* (2013.01)

(58) Field of Classification Search
CPC ........ G06Q 10/00; G06Q 20/00; G06Q 30/00; G06Q 40/00

USPC ...................................................... 705/3-44
See application file for complete search history.

(56) References Cited

U.S. PATENT DOCUMENTS

| | | | |
|---|---|---|---|
| 5,557,518 | A | 9/1996 | Rosen |
| 6,029,150 | A | 2/2000 | Kravitz |
| 6,327,578 | B1 | 12/2001 | Linehan |
| 7,316,030 | B2 | 1/2008 | Audebert et al. |
| 7,571,139 | B1 | 8/2009 | Giordano et al. |
| 7,707,120 | B2 | 4/2010 | Dominguez et al. |
| 7,805,376 | B2 | 9/2010 | Smith |

(Continued)

FOREIGN PATENT DOCUMENTS

| | | |
|---|---|---|
| WO | 2005-001618 | 1/2005 |
| WO | 2008/131021 A1 | 10/2008 |

OTHER PUBLICATIONS

Office Action mailed Feb. 24, 2014 in U.S. Appl. No. 13/686,759, 5 pages.

(Continued)

*Primary Examiner* — Frantzy Poinvil
(74) *Attorney, Agent, or Firm* — Kilpatrick Townsend & Stockton LLP

(57) ABSTRACT

A token based transaction authentication system is disclosed. Issuer, merchants, and a payment processing network generate unique tokens or keys to authenticate messages between themselves and to authenticate a sending entity or consumer as they are redirected between entities. The tokens are also used to identify the particular authentication thread a message or sending entity is associated with. The sending entity authentication occurs over a web-based channel or a mobile based channel.

25 Claims, 5 Drawing Sheets

(56) References Cited

U.S. PATENT DOCUMENTS

| | | |
|---|---|---|
| 7,827,115 B2 | 11/2010 | Weller et al. |
| 7,849,014 B2 * | 12/2010 | Erikson .................. 705/44 |
| 7,890,393 B2 | 2/2011 | Talbert et al. |
| 7,991,701 B2 | 8/2011 | Weller et al. |
| 8,019,691 B2 | 9/2011 | Dominguez et al. |
| 8,271,395 B2 | 9/2012 | Dominguez et al. |
| 8,346,666 B2 * | 1/2013 | Lindelsee et al. .......... 705/44 |
| 8,509,680 B2 | 8/2013 | Atsmon et al. |
| 8,571,837 B1 * | 10/2013 | Hou ...................... 703/2 |
| 8,577,803 B2 * | 11/2013 | Chatterjee et al. ......... 705/41 |
| 8,924,301 B2 | 12/2014 | Lindelsee |
| 2002/0111919 A1 | 8/2002 | Weller et al. |
| 2003/0126094 A1 | 7/2003 | Fisher |
| 2005/0097060 A1 | 5/2005 | Lee et al. |
| 2005/0246278 A1 | 11/2005 | Gerber et al. |
| 2006/0144925 A1 * | 7/2006 | Jones ..................... 235/380 |
| 2007/0083460 A1 | 4/2007 | Bachenheimer |
| 2007/0094150 A1 | 4/2007 | Yuen et al. |
| 2007/0245414 A1 | 10/2007 | Chan |
| 2008/0027865 A1 | 1/2008 | Usui et al. |
| 2008/0167000 A1 | 7/2008 | Wentker et al. |
| 2008/0167017 A1 | 7/2008 | Wentker et al. |
| 2008/0167961 A1 | 7/2008 | Wentker et al. |
| 2008/0172317 A1 | 7/2008 | Deibert et al. |
| 2009/0037982 A1 | 2/2009 | Wentker et al. |
| 2009/0132413 A1 | 5/2009 | Engelbrecht |
| 2009/0325542 A1 | 12/2009 | Wentker et al. |
| 2010/0082486 A1 | 4/2010 | Lee |
| 2010/0114776 A1 | 5/2010 | Weller |
| 2010/0153272 A1 | 6/2010 | Wentker et al. |
| 2010/0312703 A1 | 12/2010 | Kulpati et al. |
| 2010/0332393 A1 | 12/2010 | Weller et al. |
| 2011/0010234 A1 | 1/2011 | Lindelsee et al. |
| 2011/0016051 A1 | 1/2011 | Trifiletti et al. |
| 2011/0161233 A1 * | 6/2011 | Tieken .................... 705/71 |
| 2011/0178926 A1 | 7/2011 | Lindelsee et al. |

OTHER PUBLICATIONS

International Search Report and Written Opinion mailed Oct. 18, 2011, in PCT/US2011/021737, 10 pages.

Office Acton mailed Apr. 9, 2015 in Chinese Patent Application No. 201180009119.X, 5 pages.

Office Action mailed Aug. 23, 2015 in U.S. Appl. No. 13/009,177, 7 pages.

* cited by examiner though the sending entity authentication may require the sending entity to be redirected between a merchant and an issuer, and may involve verification messages sent between multiple entities.

TOKEN BASED TRANSACTION AUTHENTICATION

CROSS-REFERENCES TO RELATED APPLICATIONS

This application is a continuation of U.S. patent application Ser. No. 13/009,162, filed Jan. 19, 2011, now U.S. Pat. No. 8,346,666, which is a non-provisional application which claims the benefit under 35 U.S.C. 119(e)of U.S. Provisional Patent Application No. 61/296,385, filed Jan. 19, 2010, all of which are all herein incorporated by reference.

BACKGROUND

Online and mobile payments often present a higher level of risk because a payment card may not be physically presented to a merchant. Differing transaction types, such as mobile payments or money transfers, may require more interaction between issuers, merchants, payment processing networks, and sending entities, which introduces additional risk. To reduce the risk involved with various transactions types, sending entities may be authenticated by an issuer. However, sending entity authentication may require the sending entity to be redirected between a merchant and an issuer, and may involve verification messages sent between multiple entities.

The fragmented authentication process between various entities with multiple redirections exposes the system to injection attacks, where malicious parties may pose as a valid entity to collect sensitive data, hijack a transaction, or otherwise disrupt the transaction or compromise data security. The merchant, issuer, and payment processing network may also process multiple transactions simultaneously, potentially with each other, and thus may need to clearly identify a sending entity and received messages in the context of a specific instance of an authentication process.

Thus, there is a need in the art for a token based transaction authentication system that addresses the above concerns. Embodiments of the invention address these and other problems, individually and collectively.

BRIEF SUMMARY

Embodiments of the invention disclosed herein include systems, technical architecture of the systems, and methods for a token based transaction authentication system. A token based transaction authentication system can be implemented using one or more computer apparatuses and databases.

One embodiment of the invention is directed to a method for sending a message comprising a first payment reference identifier to a merchant, receiving from the merchant a second payment reference identifier, a consumer payment nickname, and a merchant key, determining if the second payment reference identifier matches the first payment reference identifier, analyzing the consumer payment nickname to determine an issuer, communicating to the issuer a message comprising the first payment reference identifier, the merchant key, and the consumer payment nickname, receiving from the issuer an authentication address, an issuer key, and a third payment reference identifier, and determining if the third payment reference identifier matches the first payment reference identifier.

Another embodiment of the invention is directed to a method for sending the authentication address, issuer key, merchant key, and first payment reference identifier to the merchant, wherein the merchant sends the authentication address, issuer key, merchant key, and first payment reference identifier to a sending entity and redirects the sending entity to the authentication address, wherein the sending entity authenticates with the issuer by providing the issuer key and a passcode, wherein the issuer determines if the issuer key received from the sending entity matches the issuer key the issuer sent, and where after the sending entity is redirected to the merchant with the first payment reference identifier and wherein the sending entity authenticates with the merchant by providing the merchant key and wherein the merchant determines if the merchant key received from the sending entity matches the merchant key the merchant sent.

Another embodiment of the invention is directed to a method for receiving a merchant key from a merchant and an issuer key from an issuer and generating a payment reference identifier, sending to the merchant a message comprising the merchant key, the issuer key, and the payment reference identifier, where merchant sends the merchant key, issuer key, and payment reference identifier to the sending entity and redirects the sending entity to the issuer, where the sending entity authenticates with the issuer by providing the issuer key, and afterwards the issuer redirects the sending entity to the merchant, where the sending entity authenticates with the merchant by providing the merchant key.

DETAILED DESCRIPTION

Figure 1:
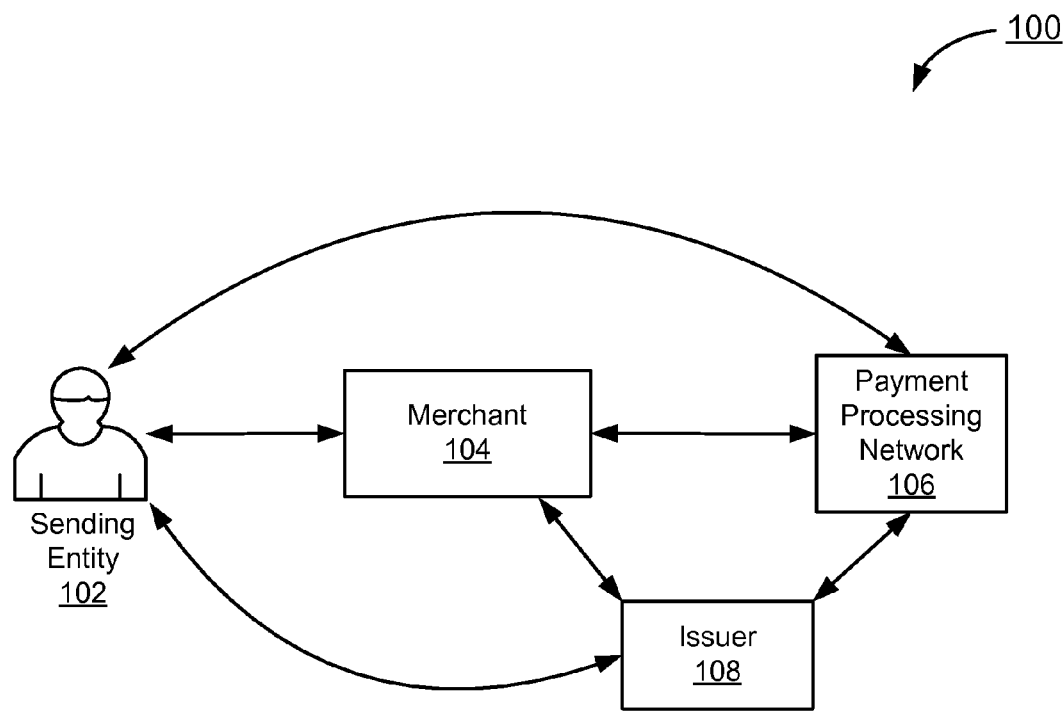
FIG. 1 is a token based transaction authentication system, according to an example embodiment.

Embodiments of the invention are directed to systems, architectures of the systems, and methods conducting a token based transaction authentication.

In certain embodiments, the token based transaction authentication system authenticates transactions and money transfers. As a sending entity is redirected between a merchant, an issuer, and a payment processing network, during an authentication process, and as these entities communicate with each other to authenticate the sending entity and to verify authentication, unique tokens, or keys, are generated by the payment processing network, merchant, and the issuer to authenticate the sending entity, messages between the entities, and to identify an authentication thread. As used herein, an "authentication thread" may represent a particular instantiation of an authentication process.

The authentication process may support, and may precede, transactions conducted between the sending entity, such as a consumer, and the merchant, where the sending entity uses a portable consumer device to send funds to the merchant. A "portable consumer device" may be a credit card, a debit card, a mobile phone, a pre-paid card, a mobile application, a payment instrument, or any portable device or software application capable of funding transferring funds. For example, the transferring of funds may occur from an account associated with the sending entity credit card to the merchant's merchant bank account, and may require issuer authorization of the transaction. Examples of such transfer of funds may include the use of a credit card for shopping with an online merchant.

The token based transaction authentication system may also support, and may precede, money transfers between portable consumer devices. In an example embodiment, a money transfer is a transaction that transfers funds from one account associated with a portable consumer device to another account associated with another portable consumer device. In an example embodiment, a money transfer may transfer funds from one credit account to another credit account. In another embodiment, the accounts may be associated with a mobile device, such as a mobile phone or a smart card. In an example embodiment, the accounts may be associated with a payment processing network and/or held by issuing entities or banks.

In an example embodiment, the sending entity authentication process may utilize a web-based authentication channel, where payment and authentication information is communicated via the web. In a further embodiment, the sending entity authentication process may utilize a mobile-based authentication channel where payment and authentication information is sent via mobile device communication protocol, such as SMS, mobile application, mobile web, or USSD2.

The token based transaction authentication system may facilitate the authentication of sending entities involved in transactions and money transfers. In an example embodiment, portable consumer devices may be associated with sensitive information, such as a credit card expiration date, a CVV2, or a primary account number ("PAN"), also referring to a permanent account number or a personal account number. In an example embodiment, aliases, also known as "consumer identity aliases" ("CIA"), may be used to identify a sending entity to preserve privacy and reduce the likelihood of fraud associated with sharing sensitive information. In an example embodiment, an alias may be an alpha-numeric value, such as a username. In a further embodiment, an alias may be a verifiable value, such as a phone number or an email address. For example, a money transfer transaction may send money to the alias "ted@ted.com" rather than a credit card or bank account number. A "consumer payment nickname" ("CPN") may be used to identify portable consumer devices. A CPN may be a sending entity defined nickname, such as "My Green Card," "My Yellow Card," etc. A CPN may include any combination of letters, numbers, and characters, may be an alpha-numeric string, a token, or may be static or dynamic. The CPN may be used to identify a portable consumer device and to protect identifying PAN data. For example, CPN data may be shared with a merchant when a sending entity does not want PAN data exposed. In an example embodiment, certain CPNs may only be authenticated through certain authentication channels. For example, there could be a CPN that can be authenticated via the web, but not via mobile.

The token based transaction authentication system may comprise a sending entity, a merchant, a payment processing network, and an issuer. In an example embodiment, the sending entity may communicate via a web entity and a mobile entity. In an example embodiment, the sending entity initiates a transaction with the merchant. The sending entity may communicate with the merchant via a web-based, mobile, or other communication channel. For example, a sending entity may initiate a transaction at a merchant website. The sending entity may identify himself or herself by providing to the merchant a consumer identity alias. The merchant may then query the payment processing network to verify that the CIA is valid and that it is associated with a portable consumer device. The payment processing network may respond to the merchant query by looking up the CIA and returning a list of CPNs associated with the CIA, the CPNs representing the portable consumer devices the sending entity may be able to use to pay for the merchant's goods. In an example embodiment, the sending entity has registered the CIA with the payment processing network and the registration information is accessible by the payment processing network. A CIA may be associated with one or more CPNs. The payment processing network may also analyze the list of CPNs and return only those CPNs that may be authenticated via the authentication channel used by the sending entity to initiate the transaction. The payment processing network may also send a payment reference identifier (a "PRID") to the merchant.

As used herein, a "payment reference identifier" may include any combination of letters, numbers, and characters, may be an alpha-numeric string, a token, or may be static or dynamic. The PRID may identify a particular transaction the sending entity is initiating and may be generated by the payment processing network. In an example embodiment, a PRID is unique within a period of ten years and are generated using a random or pseudo random process. In an example embodiment, the PRID comprises of a timestamp component, a sequence number component, and a hash component. The time stamp component may identify the time to the nearest 1/100 of a second. The sequence number component may be a short integer to identify the stage of state of a particular transaction. The hash component may be a hash of the time stamp and sequence number, or another portion of the PRID, to confirm that the message was sent by a legitimate party to a reasonable degree.

The PRID may be passed between the sending entity, the merchant, the payment processing network, and the issuer to identify a particular authentication thread. Because the merchant, issuer, and payment processing network may be processing multiple authentications simultaneously, a PRID may identify a specific authentication thread. As used herein, an "authentication thread" identifies a specific instance of an authentication process for a particular transaction. For example, a PRID may identify that a particular message or request is for a particular authentication thread that started at time X, with merchant Y, from sending entity Z, etc. An authentication thread may also identify a particular stage or state of a transaction, for example that a transaction is at the stage where a sending entity should authentication directly with an issuer. This may assist when the sending entity, the merchant, the payment processing network, and the issuer are engaged in multiple simultaneous transactions. The use of a PRID also defends against injection attacks, as malicious entities will be very unlikely to determine the PRID value. The payment processing network may store and remember the value of the PRID and match it to the authentication thread.

If more than one CPN is associated with the provided CIA, the merchant may present the list of CPNs to the sending entity. The list of CPNs may be sent to the sending entity via the web, SMS, IVR, or via other communications network. The sending entity then selects one CPN of the list of CPNs to use in the authentication process and sends that selection to the merchant. If no CPN is associated with the provided CIA, then the authentication process may be terminated. If only one CPN is associated with the provided CIA, then that CPN is used and it may be that no list of CPNs is presented to the sending entity.

Upon the merchant determining the one CPN to use in the authentication process, the merchant then sends a message to the payment processing network to initiate the authentication request. The merchant may request from the payment processing network the address where the sending entity may be redirected in order to authenticate. In an example embodiment, the merchant may also return the PRID to the payment processing network with the one CPN, and the payment processing network may use the PRID to authenticate the message and identify the authentication thread. The merchant may also send a merchant key to the payment processing network.

As used herein, a "merchant key" may include any combination of letters, numbers, and characters, may be an alpha-numeric string, a token, or may be static or dynamic. The merchant key may identify the merchant or may identify the authentication thread from the perspective of the merchant. The merchant key may be generated by the merchant. The merchant stores and remembers the value of the merchant key and the PRID and may authenticate messages and identify the authentication thread with the merchant key.

The payment processing network may analyze the CIA to determine the associated issuer. An issuer may provide authentication services to the sending entity. In another embodiment, the issuer may be an issuing bank that issued the portable consumer device to the sending entity. In a further embodiment, the issuer may have issued the portable consumer device associated with the CIA used in the transaction. The payment processing network may send the PRID, merchant key, and the CPN to the issuer. In an example embodiment, the payment processing network may also send the PAN associated with the CPN to the issuer.

Upon receiving the PRID, merchant key, and the CPN from the payment processing network, the issuer may check to see if the PRID has already been processed. If the PRID has already been processed by the issuer, the message from the payment processing network may be ignored. If the PRID has not been processed, then the issuer may analyze the PRID and CPN/PAN to determine an authentication address. An authentication address may be a URL, IP address, a link, or data that directs a user to a new location, system, or application. The authentication address may lead to an authentication server operated by the issuer. The issuer then sends the PRID, authentication address, and an issuer key to the payment processing network.

As used herein, the "issuer key" may include any combination of letters, numbers, and characters, may be an alpha-numeric string, or token, or may be static or dynamic. The issuer key may identify the issuer or may identify the transaction from the perspective of the issuer. The issuer key may be generated by the issuer. The issuer may then memorialize that the authentication address has been provided for the PRID. The issuer key may also be provided to the sending entity so that when the sending entity is redirected to the issuer to authenticate, the issuer key can be returned to the issuer to authenticate and identify the authentication thread.

The payment processing network receives the authentication address, issuer key, and the PRID from the issuer. Upon receiving the data, the payment processing network may analyze the PRID to see that it is valid and to map it to an authentication thread. The payment processing network may then provide the authentication address, PRID, issuer key, and merchant key to the merchant. Upon receiving the data, the merchant may analyze the PRID to authenticate the message and to match it to an authentication thread. In addition, the merchant may also analyze the merchant key to authenticate the message and to match it to an authentication thread. The merchant may then send the authentication address, issuer key, PRID, and merchant key to the sending entity. The merchant may also redirect the sending entity to the authentication address. In an example embodiment, the sending entity's browser is directed from a merchant website to the authentication address. The authentication address may lead to an authentication webpage hosted by the issuer.

Upon the sending entity being redirected to the authentication address/issuer, the sending entity may provide the issuer key and PRID to the issuer. The issuer key and/or PRID may be used to authenticate the message and the sending entity and identify the authentication thread. After analyzing the issuer key/PRID, the issuer may present the CPN/PAN to the sending entity and request a passcode. The sending entity may provide a passcode to the issuer via the Internet, mobile phone, SMS, or other communication channel. If the passcode authenticates the sending entity, the issuer may provide a command to redirect the sending entity back to the merchant.

After the sending entity is redirected to the merchant, the sending entity provides the merchant key and the PRID to the merchant. The merchant key and/or PRID may be used to authenticate the message and identify the authentication thread. The merchant then may check whether the sending entity has successfully authenticated with the issuer. The merchant then sends an authentication status request message to the payment processing network. The authentication status request message may comprise the PRID, merchant key, and the issuer key. The payment processing network may authenticate the message using the PRID and identify the authentication thread and then send the authentication status request to the issuer. The authentication status request may include the PRID. The issuer responds to the payment processing network as to whether the sending entity authenticated for that PRID/issuer key combination, and may analyze the PRID to authenticate the message and identify the authentication thread. The issuer response is then sent by the payment processing network to the merchant. If the sending entity did authenticate with the issuer, then the merchant notifies the sending entity of the successful authentication. The merchant may then communicate with the payment processing network and the issuer to conduct a transaction or money transfer. If the sending entity did not successfully authenticate, the merchant may prompt the sending entity to authenticate again, proceed with the transaction regardless, or cancel the transaction.

Other specific examples of embodiments of the invention are described in further detail below.

I. Systems

FIG. 1 is a token based transaction authentication system, according to an example embodiment. The token based transaction authentication system 100 comprises a sending entity 102, a merchant 104, a payment processing network 106, and an issuer 108. Although only one sending entity 102, one merchant 104, one payment processing network 106, and one issuer 108 are shown, there may be any suitable number of any of these entities in the token based transaction authentication system 100.

The sending entity 102 can be a consumer that uses the portable consumer device to conduct a transaction or money transfer, and may further operate one or more user devices, including a mobile device which may comprise a mobile phone.

As used herein a merchant 104 may refer to any suitable entity or entities that can conduct a transaction with the sending entity. The merchant 104 may have a physical location which sells goods and services to the user. The merchant 104 may use an e-commerce business to allow the transaction to be conducted by the merchant through the Internet. Other examples of a merchant 104 include a department store, a gas station, a drug store, a grocery store, or other suitable business.

The payment processing network 106 refers to a network of suitable entities that have information related to an account associated with the portable consumer device. This information includes data associated with the account on the portable consumer device such as profile information, data, and other suitable information.

The payment processing network 106 may have or operate a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. The server computer may use any of a variety of computing structures, arrangements, and compilations for servicing the requests from one or more client computers.

The payment processing network 106 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 106 may use any suitable wired or wireless network, including the Internet.

The issuer 108 refers to any suitable entity that may open and maintain an account associated with the portable consumer device used by the sending entity. Some examples of issuers 108 may be a bank, a business entity such as a retail store, or a governmental entity.

The sending entity 102 is in communication with the merchant 104. In an example embodiment, the merchant 104 may operate a merchant computer apparatus, be a physical store, a collection of servers, a e-commerce entity, or the logical representation of an online entity comprising of a webpage supported by servers. In an example embodiment, the merchant 104 may be an online merchant which the sending entity 102 communicates with via the Internet or a mobile network. The sending entity 102 may communicate with the merchant 104 via a merchant website (not shown), such as an online e-commerce website. The sending entity 102 may communicate with the merchant 104 via the Internet, mobile phone, mobile network, or any communications network. The sending entity 102 may communicate with the merchant 104 to provide a CIA, a CPN, to be redirected to an authentication server, and to receive acknowledgement of a successful authentication.

The sending entity 102 may also be in communication with the issuer 108. In an example embodiment, the issuer 108 may operate an issuer computer apparatus, may be a physical bank, a collection of servers, an online bank, or the logical representation of an online entity comprising of web accessible authentication functions and services. In a further embodiment, the issuer may be a bank with accessible authentication services. In an example embodiment, the sending entity 102 may authenticate with the issuer 108 by providing a CPN and a passcode. In an example embodiment, the sending entity's portable consumer device (not shown) may have been issued by the issuer 108 to the sending entity 102.

The merchant 104 and the issuer 108 may be in communication with a payment processing network 106 to determine the CPNs associated with a CIA, to determine the issuer associated with a CPN, to receive various keys and tokens necessary to authenticate the sending entity 102, and to determine if the sending entity 102 successfully authenticated with the issuer 108. The payment processing network 106 may communicate with the issuer 108 to determine an authentication address in which to redirect the sending entity 102 and to later verify that the sending entity 102 successfully authenticated with the issuer 108. The payment processing network 106 may send account funding transaction/original credit transaction messages to the issuer 108 and the merchant's bank in order to effectuate a money transfer. The payment processing network 106 may also send debit and deposit messages to the issuer 108/merchant's 106 bank to effectuate a credit/debit card transaction.

The sending entity 102 may also communicate with the payment processing network 106. The sending entity 102 may communicate with the payment processing network 106 after the authentication process to conduct a transaction, and may also communicate with the payment processing network 106 before the authentication to register/enroll for the authentication services. In an example embodiment, the sending entity 102 may communicate with the payment processing networking 106 during the authentication process to provide and receive authentication data.

The merchant 104 may also communicate with the issuer 108. In an example embodiment, the merchant 104 may receive the status of an authentication request from the issuer 108.

Communications between entities in the token based transaction authentication system 100 may be conducted via the web, a mobile network, an intranet, SMS/IVR, a plain old telephone system, email, USSD-2, APIs, tailored messages, a specialized application, or a communications network.

Figure 2:
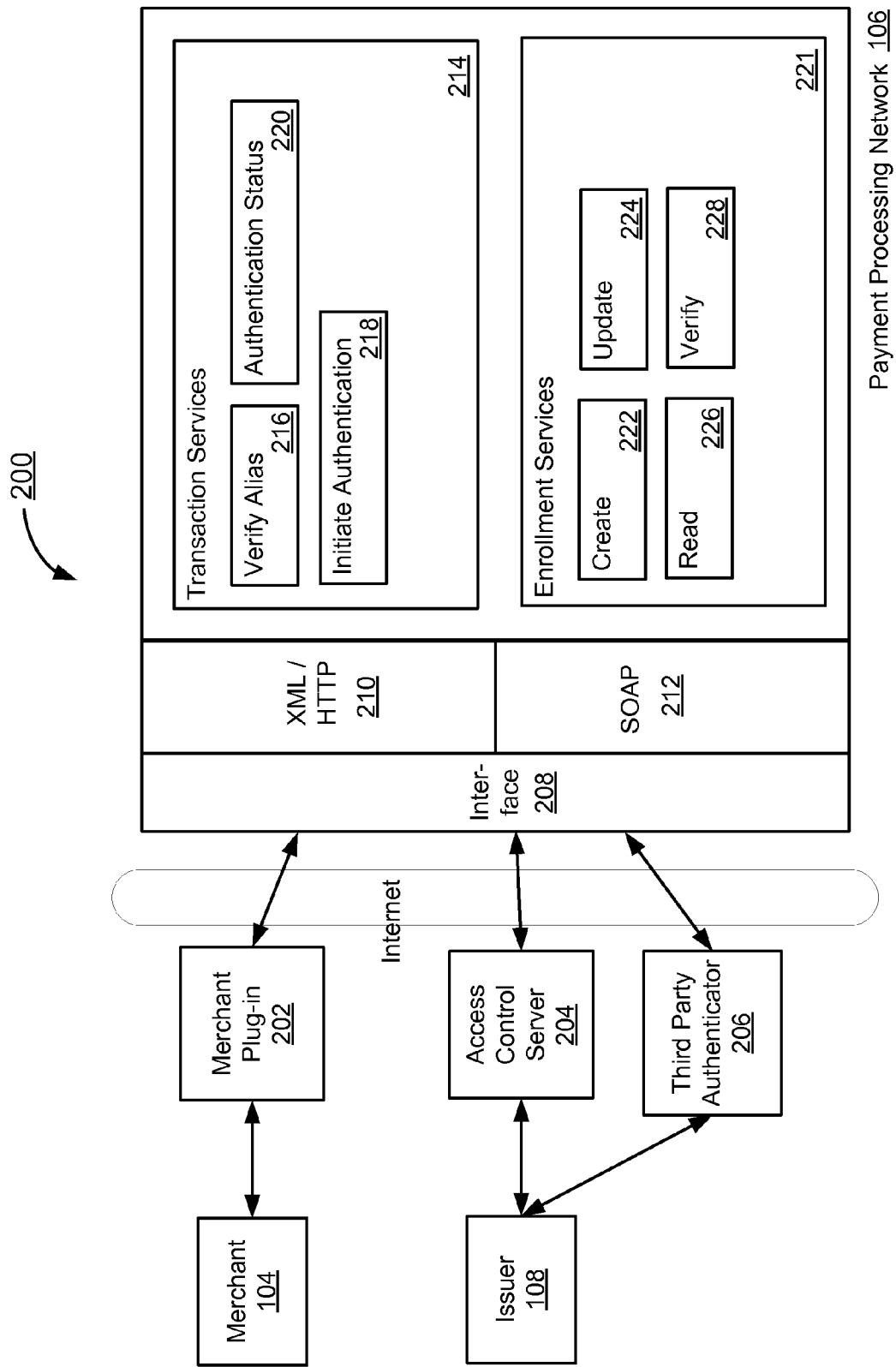
FIG. 2 is a more detailed block diagram of a token based transaction authentication system, according to an example embodiment.

FIG. 2 is a more detailed block diagram of a token based transaction authentication system 200, according to an example embodiment. In this block diagram, the merchant 104 may communicate with the payment processing network 106 via a merchant plug-in 202. The merchant plug-in 202 may be software installed with the merchant's 104 system which implement the logic to support an authentication protocol, such as the protocol described in FIG. 3. The merchant plug-in 202 may communicate with the payment processing network 106 via the Internet and a payment processing network interface 208.

The issuer 108 may communicate with the payment processing network's interface 208 via an access control server 204 or a third party authenticator 206. An access control server 204 may comprise a server operated or facilitated by the issuer 108 that may authenticate holders of portable consumer devices. A third party authenticator 306 may be used by the issuer 108 to perform authentication operations if the issuer 108 does not posses an access control server 204 or does not support authentication directly. The third party authenticator 306 may be a server or service provider that can perform the authentication steps for the issuer 108. The access control server 204 and the third party authenticator 206 may communicate with the payment processing network 106 via the Internet and through a payment processing network interface 208.

The payment processing network interface 208 may possess modules that support various communication protocols. The payment processing network interface 208 may posses an XML/HTTP module 210 and a SOAP (simple object access protocol) module 212 to receive, parse, and analyze messages sent via XML, HTTP, and SOAP. The XML/HTTP module 210 and the SOAP module 212 may also package and create outgoing messages in their respective formats.

The payment processing network 106 may comprise a transaction services module 214 and an enrollment services module 221. The transaction services module 214 may support the processing of transactions through the payment processing network 106.

The transaction services module 214 may comprise a verify alias module 216. The verify alias module 216 may comprise logic to receive a message to verify an alias or a CIA. In an example embodiment, the verify alias module 214 may receive a CIA and determine CPNs associated with the CIA. The verify alias module 216 may also send a response message comprising of the discovered CPNs. In an example embodiment, the verify alias module 214 analyzes and sends a verify alias request message and a verify alias response message. In a further embodiment, the messages are sent to and from a merchant 104 or merchant plug-in 202.

The transaction services module 214 may also comprise an initiate authentication module 218. The initiate authentication module 218 may comprise logic to receive a message to initiate authentication, send an authentication request to an authenticating entity, receive an authentication response from the authentication entity, and forward the authentication response. In an example embodiment, the initiate authentication module 218 receives a request to initiate authentication. The request to initiate authentication may include a CPN, and a merchant key. The initiate authentication module 218 may analyze the CPN and determine the associated PAN and issuer 108. The initiate authentication module 218 may then send an initiate authentication request message to the issuer 108 and receive the issuer's 108 initiate authentication response message. The initiate authentication module 218 may then analyze the issuer's response message and send a initiate authentication response message to the merchant 104. In an example embodiment, the issuer 108 may return an issuer key in the initiate authentication response message and the issuer key may be sent to the merchant 104. In an example embodiment, the initiate authentication module 218 analyzes and sends a initiate authentication request message and an initiate authentication response message. In a further embodiment, the messages are sent to and from a merchant 104 or merchant plug-in 202.

The transaction services module 214 may also comprise an authentication status module 220. The authentication status module 220 may comprise logic to receive a message to determine an authentication status, send a message to determine authentication status to an authenticating entity, receive an authentication status response from the authentication entity, and forward the authentication status response. In an example embodiment, the authentication status module 220 may receive an authentication status request from a merchant 104, may send an authentication status request to an issuer 108, may receive an authentication status response from an issuer 108, and may send an authentication status response to a merchant 104. In an example embodiment, the authentication status module 220 analyzes and sends an authentication status request message and an authentication status response message. In a further embodiment, the messages are sent to and from a merchant 104 or merchant plug-in 202.

The enrollment services module 221 may support the enrollment/registration of a sending entity 102 with the payment processing network 106. The enrollment services module 221 may comprise a create 222, update 224, read 226, and verify 228 modules. These modules may assist in the enrollment of a sending entity 102 with the payment processing network 106. In an example embodiment, the sending entity 102 may enroll in the authentication program with the payment processing network 106, which may allow the sending entity 102 to utilize the protocol of FIG. 3. The create module 222 may create a user profile in the payment processing network. The user profile may determine and associate relevant CIAs, CPNs, passcodes, and other user data. The update module 224 may be used to update the user profile data. The read module 226 may be used to read the user profile, such as when determining which CPN are associated with a CIA. The verify module 228 may verify data stored in the user profile. In an example embodiment, the data gathered during user enrollment may be shared with an associated issuer 108.

The payment processing network 106 may also be a remote directory providing remote services.

II. Method

A. Web Based Authentication

Figure 3:
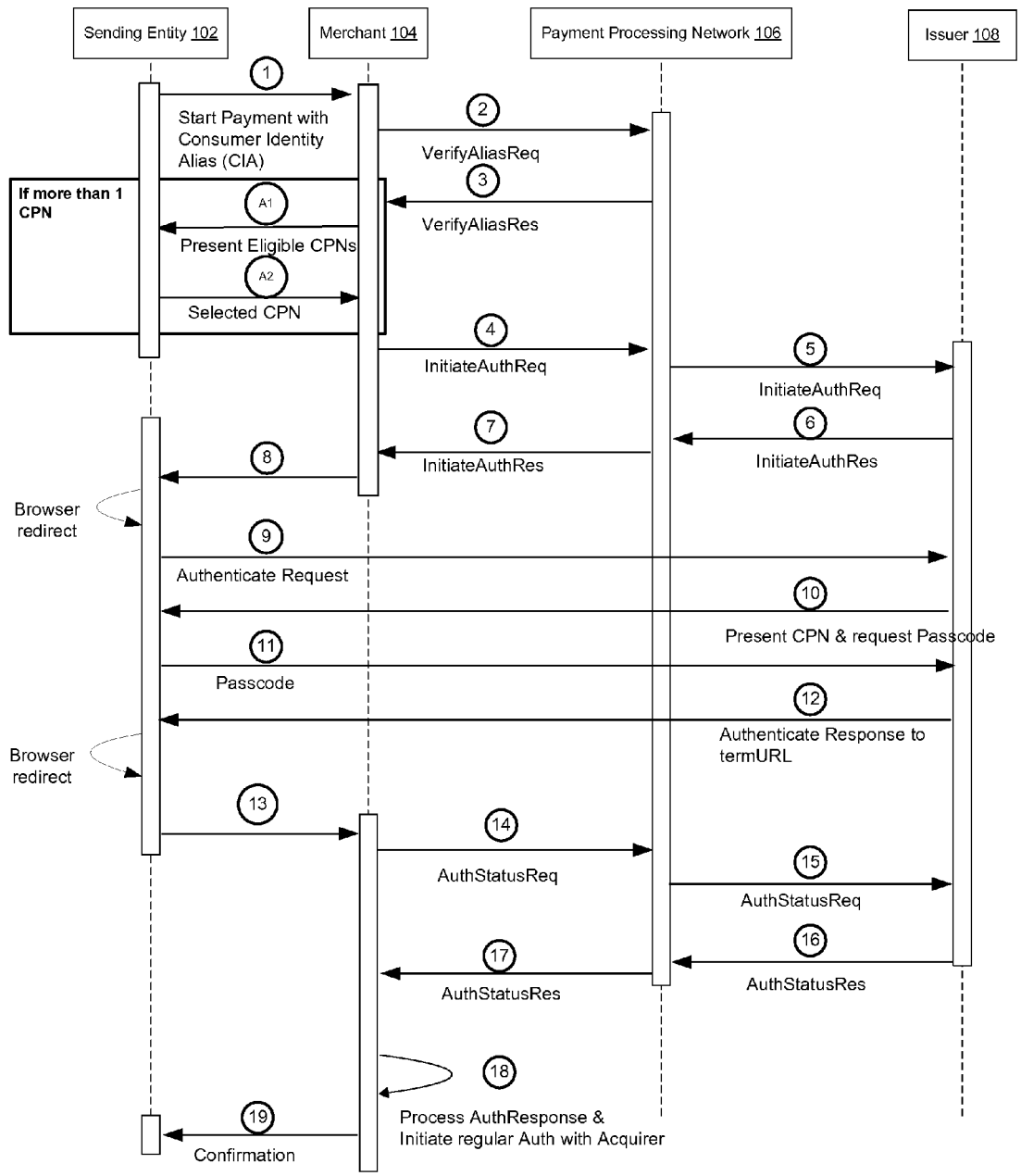
FIG. 3 is process flow of a web based authentication process, according to an example embodiment.

FIG. 3 is process flow of a web based authentication process, according to an example embodiment. At operation 1, the sending entity 102 initiates a transaction with the merchant 104 by providing a CIA/alias. The sending entity 102 may prefer to provide a CIA as opposed to a PAN for various security or convenience factors. The sending entity 102 provides the CIA to the merchant 104 via the web, such as through a website, a merchant operated online store, an application, or other web enabled communication medium. In an example embodiment, the sending entity 102 may communicate with the merchant 104 via a merchant plug-in 202. The sending entity 102 may also provide additional information to the merchant 104. For example, a sending entity 102 may visit a merchant website and select items to buy. To purchase the items the sending entity 102 may provide to the merchant 104 a message comprising the CIA "ted@ted.com" or a phone number.

Upon receiving the message from the sending entity 102 sent in operation 1, the merchant 104 may analyze the data. At operation 2, the merchant may then send the CIA in a message to the payment processing network 106 to verify. In an example embodiment, the merchant 104 sends a verify alias request message, comprising the CIA, and created by the merchant plug-in 202, to the payment processing network 106. For example, the merchant 104 may receive a message comprising the CIA "ted@ted.com" from the sending entity 102 and then send a message comprising the CIA "ted@ted.com" to the payment processing network 106.

The payment processing network 106 receives the message from the merchant 104 sent in operation 2 and analyzes the content. The payment processing network 106 may analyze the CIA by looking up the CIA and retrieving CPNs associated with the CIA. In an example embodiment, the CPNs are associated with the CIA during a user enrollment process with the payment processing network 106, where the sending entity 102 may create a CIA and where they may add one or more portable consumer devices and create a CPN for each device. The CPN data may indicate which authentication channels are available with that particular CPN. In an example embodiment, every unique CPN/authentication channel pair may be added in a CPN list.

In operation 3, the payment processing network 106 may send the CPNs to the merchant 104. In an example embodiment, the payment processing network 106 may send only the CPN/authentication channel pairs that are eligible under a web-based authentication channel. In an example embodiment, the payment processing network 106 packages the CPN data in a verify alias response message.

The payment processing network 106 may also generate a PRID in response to the merchant request message. A request by a merchant 104 for alias data may be the first step of many in an authentication process. The payment processing network 106 may assign a PRID to an authentication thread. The PRID may be used to authenticate later messages the payment processing network 106 receives. For example, the PRID may be passed from entity to entity during the entire authentication process, so that when a message is received by the payment processing network 106 from another entity, the payment processing network 106 may identify which authentication thread the message is associated with and that it likely comes from a valid source. The PRID may also be used by the other entities in the authentication process to identify the authentication thread and authenticate a message. In an example embodiment, the PRID is packaged as part of the verify alias response message.

The message containing the CPN data and the PRID may be sent by the payment processing network's verify alias module 216. In an example embodiment, the message may be a verify alias response message. In a further embodiment, the message may be sent via the payment processing network interface 208. The message may be sent via the XML/HTTP module 210 or a SOAP module 212, and may be received by a merchant plug-in 202. For example, the payment processing network 106 may receive a message comprising the CIA "ted@ted.com" from the merchant 104 and lookup CPNs related to that alias. The payment processing network 106 may determine that the CPNs "Red Card," "My Green Card" and "My Blue Card" are associated with the CIA and return the CPNs in a message to the merchant 104.

The merchant 104 may receive the message containing the CPN data/PRID from the payment processing network 106 sent in operation 3. The merchant 104 may analyze the CPN data to determine what to present to the sending entity 102. If more than one CPN is listed in the CPN data, then at operation A1 the plurality of CPNs may be presented to the sending entity 102. For example, the CPNs "Red Card," "My Green Card" and "My Blue Card" be then presented to the sending entity 102.

At operation A2, the sending entity 102 may select one CPN of the plurality of CPNs and send it back to the merchant 104 to use. In an example embodiment, only eligible CPNs, given the sending entity's web-based authentication channel, may be presented. If no CPNs are eligible, then the authentication process may be canceled. If only one CPN is listed or is eligible, then that CPN is used. For example, if "Red Card" is not compatible with the initiation channel used, then only "My Green Card" and "My Blue Card" may be displayed to the sending entity 102. If only "My Blue Card" is compatible with the initiation channel used, then the sending entity 102 may not be prompted to select a CPN.

After determining the one CPN to be used in the authentication process, the merchant 104 may send a message to the payment processing network 106 at operation 4 identifying the sending entity 102 selected CPN. The message sent to the payment processing network 106 may also return the PRID provided by the payment processing network 106 in operation 3. By returning the PRID to the payment processing network 106, the message sent in operation 4 may be identified as belonging to a certain authentication thread and also be authenticated as likely being valid, as it returns the PRID to the payment processing network 106.

In addition, the merchant 104 may provide a merchant key to the payment processing network 106 at operation 4. The merchant key may be generated by the merchant 104 specifically for this authentication thread. The merchant key may be passed between the entities so that later communication with the merchant 104 may include the merchant key, which may be used by the merchant 104 to identify the authentication thread and authenticate the message. In an example embodiment, the sending entity 102 selected CPN, PRID, and the merchant key may be sent by the merchant 104 in an initiate authentication request message to the payment processing network 106. The initiate authentication request message may be sent by a merchant plug-in 202.

The payment processing network 106 may receive the message from the merchant 104 sent at operation 4. The payment processing network 106 may then analyze the message content. The PRID may be analyzed to determine which authentication thread the message is associated with and to authenticate the message. The message may be received and analyzed by an initiate authentication module 218. The payment processing network 106 may also analyze the CPN to determine an associated PAN and an associated issuer 108. For example, the sending entity 102 may select the CPN "My Blue Card" and that selection may be communicated to the payment processing network 106 via the merchant 104. The payment processing network 106 may determine the PAN associated with the CIA "My Blue Card" and from the PAN determine the associated issuer 108.

The payment processing network 106 may at operation 5, send a message to the associated issuer 108. The message may comprise the PRID and the CPN/PAN. The message may also comprise the merchant key and other data. In an example embodiment, the message is an initiate authentication request message sent by the initiate authentication module 218. The message sent to the issuer 108 may be requesting an address in which to direct the sending entity 102 to in order for the sending entity 102 to authenticate with the issuer 108. For example, the payment processing network 106 may send a message to the issuer associated with "My Blue Card" to request and authentication address.

The issuer 108 receives the message sent from the payment processing network 106 in operation 5 and analyzes the content. The issuer 108 may analyze the PRID in the message to determine if an authenticating address has already been provided for that PRID. The issuer 108 may use the CPN/PAN to determine the authentication address. The authentication address may direct to the issuer 108, an issuer access control server 204, or a third party authenticator 206 authentication service. The message may be analyzed and received by the initiate authentication 218 module. If the PRID has not been seen by the issuer 108 before, then at operation 6, the issuer sends a message to the payment processing network 106 comprising the authentication address. The issuer 108 may also send the PRID and an issuer key with the message. The issuer key may be passed to payment processing network 106, to the merchant 104, to the sending entity 102, to be returned to the issuer 108 by the sending entity 102 when the sending entity 102 is redirected to the issuer 108. In an example embodiment the message is an initiate authentication response message comprising the authentication address and the issuer key. For example, the issuer 108 may receive the message from the payment processing network 106 and determine to send the sending entity 102 to "authenticate.issuer.net" to authenticate.

The payment processing network 106 receives the message sent from the issuer 108 in operation 6 and may analyze the content. The payment processing network 106 may analyze the PRID to authenticate the message and identify the authentication thread. By analyzing the PRID the payment processing network 106 may identify the merchant 104. At operation 7, the payment processing network 106 sends a message to the merchant 104 with the authentication address and the issuer key. The message may also comprise the merchant key, the PRID, and other data. In an example embodiment the message is an initiate authentication response message sent by the initiate authentication module 218.

The merchant 104 receives the message from the payment processing network 106 sent in operation 7 and may analyze its contents. For example, the merchant 104 may analyze the PRID to determine the authentication/transaction thread and the sending entity 102. At operation 8, the merchant 104 redirects the sending entity 102 browser to the authentication address. The merchant 104 may also include the PRID, issuer key, merchant key, and other data in the redirect request. In an example embodiment, the merchant 104 sends a server side HTTP redirection (30X codes). The sending entity 102 browser may then go from a merchant 104 webpage to a webpage operated by the issuer 108 or an affiliated third party authenticator 206. At operation 9, the sending entity 102 may request to be authenticated by the issuer 108. The request may include the data contained in the redirect request. For example, the authentication address "authenticate.issuer.net" may be communicated from the issuer 108 to the payment processing network 106 to the merchant 104, where the merchant 104 sends a redirect message to the sending entity browser to the address "authenticate.issuer.net." The sending entity 102 is then redirected to "authenticate.issuer.net" where it sends a message requesting to authenticate with the issuer 108.

The issuer 108 receives the message sent by the sending entity 102 in operation 9 and analyzes its contents. The issuer 108 may analyze the PRID to authenticate the message and identify the authentication thread. The issuer 108 may also analyze the issuer key to authenticate the message and identify the authentication thread. By analyzing the issuer key/PRID the issuer 108 may determine the CPN associated with the authentication thread. At operation 10 the issuer 108 presents the CPN to the sending entity 102 and requests the sending entity 102 to provide a passcode to authenticate. The sending entity 102 receives the message sent in operation 10 and responds in operation 11 with the passcode. The issuer 108 receives the passcode sent in operation 11 and verifies that it matches the passcode associated with the CPN. In operation 12, the issuer 108 sends an message to the sending entity 102 with the results of the authentication request. The message may also contain a redirect command to the sending entity 102 browser to redirect to the merchant 104. The message may also contain the merchant key, the PRID, and other data. For example, the sending entity 102 and issuer 108 may exchange passcodes and messages to authenticate at the "authenticate.issuer.net" address.

At operation 13, the sending entity 102 is redirected to the merchant 104. The sending entity 102 may provide the merchant key and the PRID to authenticate the message with the merchant 104 and to identify the authentication thread. By returning the merchant key to the merchant 104, the merchant 104 may have confidence that the redirected entity is actually the sending entity 102. For example, after the sending entity 102 provided a passcode to the issuer 108, the issuer 108 may redirect the sending entity browser back to the merchant 104.

After the merchant 104 identifies the sending entity 102 and the merchant key, the merchant 104 then queries to see if the sending entity 102 successfully authenticated. The merchant 104 sends a message to the payment processing network 106 at operation 14 inquiring about the authentication status of the sending entity 102. The message may be an authentication status request message. The payment processing network 106 receives the message from operation 14 and may determine the issuer 108. At operation 15 the payment processing network 106 sends a message to the issuer 108 inquiring about the authentication status of the sending entity 102. In an example embodiment, the message may be an authentication status request message send by the authentication status module 220. The issuer 108 receives the message sent in operation 15 and may analyze its contents. The issuer 108 may analyze the PRID to determine whether the sending entity 102 authenticated with that PRID. At operation 16 the issuer 108 sends a message to the payment processing network 106 that contains the authentication status of the sending entity 102. The payment processing network 106 receives the message and forwards it to the merchant 104 at operation 17. In an example embodiment, the message is an authentication status response message created by the authentication status module 220. The merchant 104 analyzes the message. If the authentication was successful, the merchant 104 may initiate a traditional transaction with an acquirer and issuer or a money transfer transaction. At operation 19 the merchant 104 can send a confirmation of authentication to the sending entity 102.

B. Mobile Based Authentication

Figure 4:
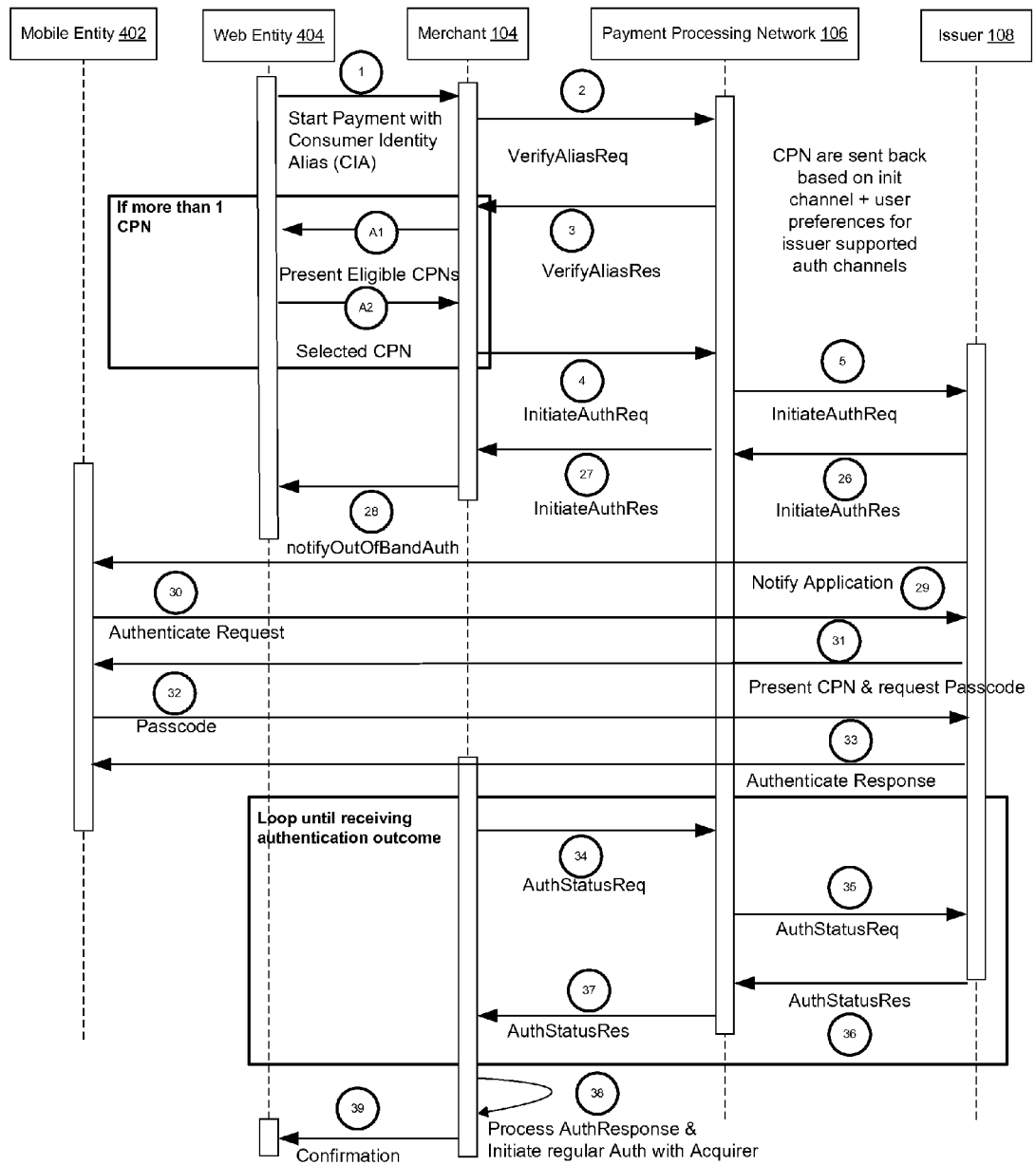
FIG. 4 is a process flow of mobile based authentication process, according to an example embodiment.

FIG. 4 is a process flow of mobile based authentication process, according to an example embodiment. Operations 1-5 in FIG. 4 operate in the same was as operations 1-5 in FIG. 3. However, in FIG. 4 the sending entity 102 communicates both through a web entity 404, such as a browser, and a mobile entity 402, such as a mobile phone. A mobile entity 402 may be a mobile phone, mobile application, or mobile device by which a sending entity 102 may communicate with other entities in a token based transaction authentication system. A web entity 404 may be a personal computer with a web browser, such as Microsoft Internet Explorer, or other web enabled device, by which a sending entity 102 may communicate with other entities in a token based transaction authentication system Also, in FIG. 4 the selected CPN at operation A2 permits for authenticating over a mobile based channel.

Starting at operation 5, the issuer 108 receives the message sent from the payment processing network 108 in operation 5 and analyzes the content. The issuer 108 may analyze the PRID in the message to determine that a mobile authentication channel has been selected. The issuer 108 may use the CPN/PAN to determine the variables of the mobile authentication, such as the phone number or SMS number. The message may be analyzed and received by the initiate authentication 218 module. If the PRID has not been seen by the issuer 108 before, then at operation 6, the issuer sends a message to the payment processing network 106 comprising a notice that a mobile authentication will occur. The issuer 108 may also send the PRID and an issuer key with the message.

The payment processing network 106 receives the message sent from the issuer 108 in operation 26 and may analyze the content. The payment processing network 106 may analyze the PRID to authenticate the message and identify the authentication thread. By analyzing the PRID the payment processing network 106 may identify the merchant 104. At operation 27, the payment processing network 106 sends a message to the merchant 104. The message may also comprise the merchant key, the PRID, and other data. In an example embodiment the message is an initiate authentication response message sent by the initiate authentication module 218. The message may indicate a mobile channel authentication.

The merchant 104 receives the message from the payment processing network 106 and may analyze its contents. For example, the merchant 104 may analyze the PRID to determine the authentication thread and the sending entity 102. At operation 28, the merchant 104 sends a message to the web entity 404 that authentication will occur on the mobile channel. The web entity 404 may then wait to receive confirmation of a successful authentication.

At operation 29, the issuer 108 sends a message to the mobile entity 402. The message may be sent via SMS, mobile web, WiFi, or other communication network. The message may be directed to a mobile application that supports the authentication protocol. The message may notify the mobile entity 402 that the issuer 108 is ready to authenticate. At operation 30, the mobile entity 402 may send a message to the issuer 108 to request authentication. Upon receiving the message sent in operation 30, the issuer 108 may send a message containing the CPN and a request for a passcode in operation 31. Upon receiving the message, the mobile entity 402 may respond with a passcode in operation 32. The issuer 108 receives the passcode and verifies that it matches the value stored with the user profile associated with the sending entity. At operation 33, the issuer 108 may send a message to the mobile entity 402 describing whether the authentication was successful or not.

During operations 29-33, operations 34-37 execute and loop continuously for a pre-determined amount of time, to check the authentication status of the sending entity 102/mobile entity 402. Before operation 34, the merchant 104 is waiting for the sending entity 102 to authenticate with the issuer 108 through the mobile entity 402. At operation 34, the merchant 104 sends a message to the payment processing network 106 requesting the status of the authentication. The message may comprise the PRID and other data. In an example embodiment, the message is an authentication status request message. The payment processing network 106 receives the message sent in operation 34, and may analyze the PRID to authenticate the message and identify the authentication thread. The payment processing network 106 may send a message to the issuer comprising of the PRID in operation 35 requesting the status of the authentication. In an example embodiment, the message is an authentication status request message created by the authentication status module 220.

The issuer 108 may receive the message sent in operation 35 and analyze its contents. The PRID may be analyzed to authenticate the message and identify the authentication thread. The issuer 108 may then send a message to the payment processing network 106, at operation 36, indicating the authentication status. The authentication status may indicate that the authentication succeeded, has failed, is in process, or is waiting for a response from the sending entity 102. The message may comprise a PRID. In an example embodiment, the message is an authentication status response message. The merchant 104 may receive the message sent in operation 36 and analyze the contents. The PRID may be analyzed to authenticate the message and to identify the authentication thread. If the merchant 104 determines that the authentication was successful, then in operations 38 and 39, the merchant 104 continues with a traditional transaction or money transfer and sends confirmation of the authentication to the web entity 404. If the authentication was not successful, is in process, or is waiting for a response from the mobile entity 402, then operations 34-37 loop until a pre-determined time period expires.

After a sending entity successfully authenticates and completes the operations listed in FIGS. 3-4 the sending entity may continue with a typical payment transaction or money transfer. In a typical purchase transaction, a sending entity purchases a good or service at the merchant using a portable consumer device, which may be in the form of a credit card. The consumer's portable consumer device can interact with an access device such as a POS (point of sale) terminal at the merchant. For example, the sending entity may take the credit card and may swipe it through an appropriate slot in the POS terminal. Alternatively, the POS terminal may be a contactless reader, and the portable consumer device may be a contactless device such as a contactless card.

An authorization request message is then forwarded to an acquirer. After receiving the authorization request message, the authorization request message is then sent to the payment processing system. The payment processing system then forwards the authorization request message to the issuer of the portable consumer device.

After the issuer receives the authorization request message, the issuer sends an authorization response message back to the payment processing system to indicate whether or not the current transaction is authorized (or not authorized). The transaction processing system then forwards the authorization response message back to the acquirer. The acquirer then sends the response message back to the merchant.

After the merchant receives the authorization response message, the access device at the merchant may then provide the authorization response message for the consumer. The response message may be displayed by the POS terminal, or may be printed out on a receipt.

At the end of the day, a normal clearing and settlement process can be conducted by the transaction processing system. A clearing process is a process of exchanging financial details between and acquirer and an issuer to facilitate posting to a consumer's account and reconciliation of the consumer's settlement position. Clearing and settlement can occur simultaneously.

Embodiments of the invention are not limited to the specific examples described above.

In another example embodiment, the authentication steps from a payment processing network perspective may comprise sending a message comprising a first payment reference identifier to a merchant, receiving from the merchant a second payment reference identifier, a consumer payment nickname, and a merchant key, determining if the second payment reference identifier matches the first payment reference identifier, analyzing the consumer payment nickname to determine an issuer, communicating to the issuer a message comprising the first payment reference identifier, the merchant key, and the consumer payment nickname, receiving from the issuer an authentication address, an issuer key, and a third payment reference identifier, and determining if the third payment reference identifier matches the first payment reference identifier.

In a further embodiment, the authentication steps from an issuer perspective may comprise receiving a message comprising the first payment reference identifier, the merchant key, and the consumer payment nickname from a payment processing network, wherein the payment processing network sent a message comprising a first payment reference identifier to a merchant, received from the merchant a second payment reference identifier, a consumer payment nickname, and a merchant key, and determined if the second payment reference identifier matched the first payment reference identifier, analyzed the consumer payment nickname to determine the issuer, and sending an authentication address, an issuer key, and a third payment reference identifier to the payment processing network, wherein the payment processing network determines if the third payment reference identifier matches the first payment reference identifier.

Figure 5:
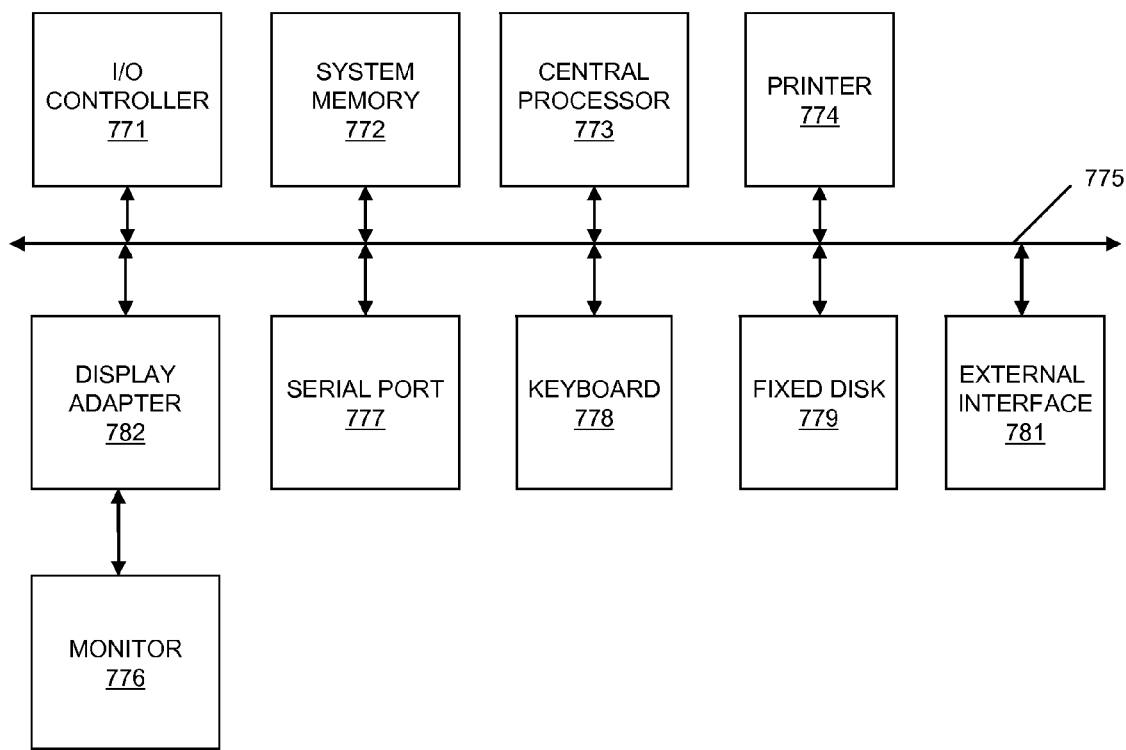
FIG. 5 is a diagram of a computer apparatus, according to an example embodiment.

FIG. 5 is a diagram of a computer apparatus, according to an example embodiment. The various participants and elements in the previously described system diagrams (e.g., the merchant, issuer, access control server, third party authenticator, payment processing network, etc. in FIGS. 1, 2, 3, 4) may use any suitable number of subsystems in the computer apparatus to facilitate the functions described herein. Examples of such subsystems or components are shown in FIG. 5. The subsystems shown in FIG. 5 are interconnected via a system bus 775. Additional subsystems such as a printer 774, keyboard 778, fixed disk 779 (or other memory comprising computer-readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Embodiments of the token based transaction authentication system may provide several advantages over existing systems. A token based transaction authentication system allows a payment processing network, issuer, and merchant to authenticate messages and associate message with an authentication thread. The merchant, issuer, and payment processing network may also process multiple transactions simultaneously, potentially with each other, and the use of a PRID, merchant key, and issuer keys allows the entities in a token based transaction authentication system to match messages with authentication threads. The use of various keys and PRIDS reduces the likelihood of injection attacks, where malicious parties may pose as a valid entity to collect sensitive data, hijack a transaction, or otherwise disrupt the transaction or compromise data security.

What is claimed is:

1. A method comprising:
   receiving, by a server computer, a consumer payment nickname from a client computer;
   receiving, by the server computer, a payment reference identifier from the client computer, wherein the payment reference identifier was previously generated by the server computer;
   analyzing, by the server computer, the received payment reference identifier;
   determining, by the server computer, that the received payment reference identifier matches the previously generated payment reference identifier to determine an authentication thread;
   analyzing, by the server computer, the consumer payment nickname;
   determining, by the server computer, an account identifier associated with the consumer payment nickname;
   determining, by the server computer, an authorization computer from the account identifier;
   generating, by the server computer, a message comprising the payment reference identifier and the account identifier;
   sending, by the server computer, the message comprising the payment reference identifier and the account identifier associated with the consumer payment nickname to the authorization computer; and
   receiving, from the authorization computer, the payment reference identifier and an authentication address, which is forwarded to the client computer and is used to authenticate a user that holds an account associated with the account identifier.

2. The method of claim 1, wherein the authorization computer is an issuer computer, and wherein the method further comprises:
   receiving, by the server computer, a verify alias request from the client computer.

3. The method of claim 1, wherein the method further comprises:
   receiving, by the server computer, a merchant key from the client computer;
   receiving, by the server computer, a verify alias request from the client computer; and
   providing, by the server computer, a verify alias response to the client computer.

4. The method of claim 1 wherein the client computer is a merchant computer.

5. The method of claim 1 wherein the receiving the consumer payment nickname and receiving the payment reference identifier occur in the same communication.

6. The method of claim 1, wherein the payment reference identifier comprises a timestamp and is analyzed by the server computer each time the server computer receives the payment reference identifier.

7. A server computer comprising:
   a processor: and
   a computer readable medium coupled to the processor, the computer readable medium comprising code, executable by the processor to implement a method comprising
   receiving, by the server computer, a consumer payment nickname from a client computer,
   receiving, by the server computer, a payment reference identifier from the client computer, wherein the payment reference identifier was previously generated by the server computer;
   analyzing, by the server computer, the received payment reference identifier;

determining, by the server computer, that the received payment reference identifier matches the previously generated payment reference identifier to determine an authentication thread;
analyzing, by the server computer, the consumer payment nickname;
determining, by the server computer, an account identifier associated with the consumer payment nickname;
determining, by the server computer, an authorization computer from the account identifier;
generating, by the server computer, a message comprising the payment reference identifier and the account identifier;
sending, by the server computer, the message comprising the payment reference identifier and the account identifier associated with the consumer payment nickname to the authorization computer; and
receiving, from the authorization computer, the payment reference identifier and an authentication address, which is forwarded to the client computer and is used to authenticate a user that holds an account associated with the account identifier.

8. The server computer of claim 7 wherein the method further comprises:
receiving, by the server computer, a verify alias request from the client computer.

9. The server computer of claim 7 wherein the method further comprises:
receiving, by the server computer, a verify alias request from the client computer; and
providing, by the server computer, a verify alias response to the client computer.

10. The server computer of claim 7 wherein the client computer is a merchant computer.

11. A system comprising:
a server computer comprising a processor and a computer readable medium coupled to the processor, the computer readable medium comprising code, executable by the processor to implement a method comprising
receiving a consumer payment nickname from a client computer,
receiving a payment reference identifier from the client computer, wherein the payment reference identifier was previously generated by the server computer, analyzing, by the server computer, the received payment reference identifier, determining, by the server computer, that the received payment reference identifier matches the previously generated payment reference identifier to determine an authentication thread;
determining an account identifier associated with the consumer payment nickname,
determining an authorization computer from the account identifier,
generating a message comprising the payment reference identifier and the account identifier,
sending the message comprising the payment reference identifier and the account identifier associated with the consumer payment nickname to the authorization computer, and
receiving, from the authorization computer, the payment reference identifier and an authentication address, which is forwarded to the client computer and is used to authenticate a user that holds an account associated with the account identifier; and
the client computer in communication with the server computer.

12. The system of claim 11, further comprising:
the authorization computer.

13. A method comprising:
sending, by a sending entity computer, a consumer payment nickname to a merchant computer, wherein the merchant computer thereafter forwards a merchant key and a payment reference identifier to a payment processing network, and wherein the payment processing network forwards an initiate authentication request to an issuer and receives an initiate authentication response including the payment reference identifier and an issuer key from the issuer;
receiving, by the sending entity computer, an authentication address for an authentication computer;
sending, by the sending entity computer, a passcode to the authentication address of the authentication computer so that the authentication computer determines an authentication result;
receiving from the authentication computer a message comprising the authentication result and a redirect command; and
automatically redirecting, using the redirect command, the sending entity computer to the merchant computer; and
generating and transmitting, by the sending entity computer, a message comprising the merchant key and the payment reference identifier to the merchant computer.

14. The method of claim 13 further comprising:
receiving the consumer payment nickname and a passcode request by the sending entity computer.

15. The method of claim 13 wherein the sending entity computer is operated by a consumer.

16. The method of claim 13 further comprising:
sending a consumer identity alias to the merchant computer; and
receiving the consumer payment nickname.

17. The method of claim 13, wherein the payment processing network is configured to process credit and debit card transactions.

18. The method of claim 13 wherein the sending entity computer is a mobile phone.

19. A sending entity computer comprising:
a processor; and
a computer readable medium coupled to the processor, the computer readable medium comprising code, executable by the processor to implement a method comprising
sending, by the sending entity computer, a consumer payment nickname to a merchant computer, wherein the merchant computer thereafter forwards a merchant key and a payment reference identifier to a payment processing network, and wherein the payment processing network forwards an initiate authentication request to an issuer and receives an initiate authentication response including the payment reference identifier and an issuer key from the issuer,
receiving, by the sending entity computer, an authentication address for an authentication computer,
sending, by the sending entity computer, a passcode to the authentication address of the authentication computer so that the authentication computer determines an authentication result
receiving from the authentication computer a message comprising the authentication result and a redirect command; and automatically redirecting, using the redirect command, the sending entity computer to the merchant computer; and generating and transmitting, by the sending entity computer, a message comprising the merchant key and the payment reference identifier to the merchant computer.

20. The sending entity computer of claim 19 wherein the method further comprises:

receiving the consumer payment nickname and a passcode request by the sending entity computer.

21. The sending entity computer of claim 19 wherein the payment processing network is configured to process credit and debit card transactions.

22. The sending entity computer of claim 19 wherein the method further comprises:

sending a consumer identity alias to the merchant computer; and receiving the consumer payment nickname.

23. The sending entity computer of claim 22, wherein the payment processing network is configured to process credit and debit card transactions.

24. The sending entity computer of claim 19 wherein the sending entity computer is a mobile phone.

25. A system comprising:

a sending entity computer comprising a processor, and a computer readable medium coupled to the processor, the computer readable medium comprising code, executable by the processor to implement a method comprising sending a consumer payment nickname to a merchant computer, wherein the merchant computer thereafter forwards a merchant key and a payment reference identifier to a payment processing network, and wherein the payment processing network forwards an initiate authentication request to an issuer and receives an initiate authentication response including the payment reference identifier and an issuer key from the issuer, receiving an authentication address for an authentication computer, sending, by the sending entity computer, a passcode to the authentication address of the authentication computer so that the authentication computer determines an authentication result, receiving from the authentication computer a message comprising the authentication result and a redirect command, and automatically redirecting, using the redirect command, the sending entity computer to the merchant computer, and generating and transmitting, by the sending entity computer, a message comprising the merchant key and the payment reference identifier to the merchant computer; and the payment processing network in communication with the sending entity computer.

\* \* \* \* \*